J. P. BEIL.
AUTOMATIC GATE OPERATING MECHANISM.
APPLICATION FILED SEPT. 4, 1915.

1,214,001.

Patented Jan. 30, 1917.

Inventor
John P. Beil

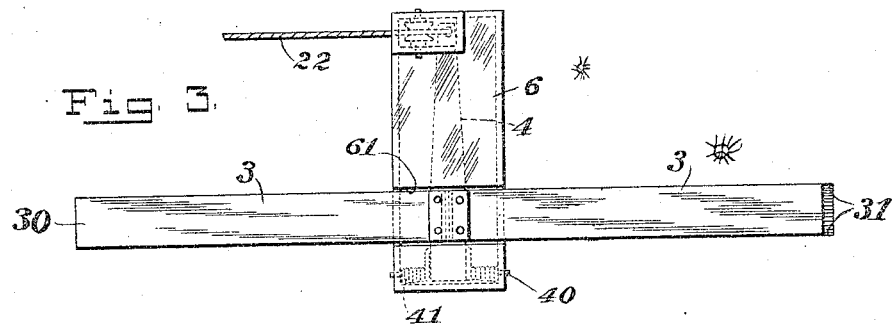
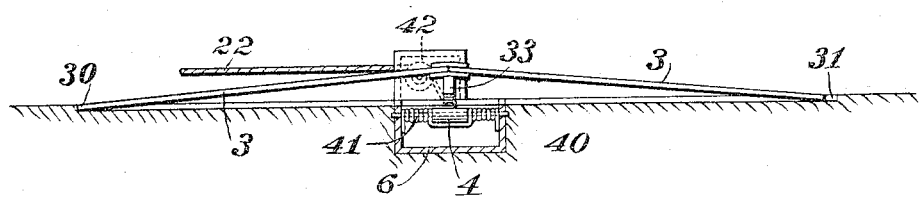
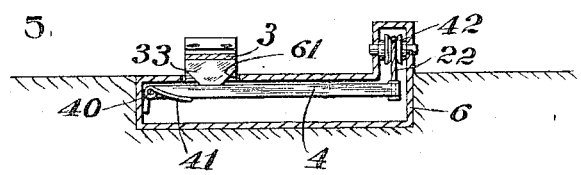
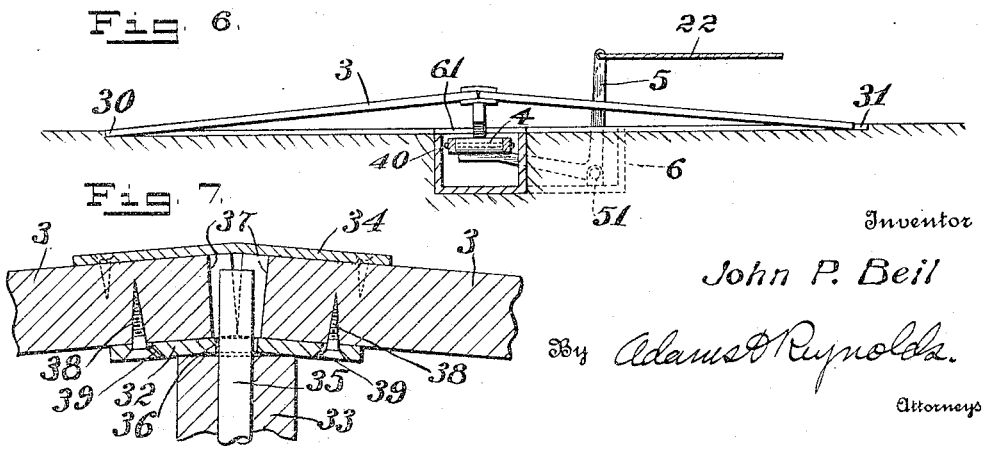

UNITED STATES PATENT OFFICE.

JOHN P. BEIL, OF KING COUNTY, WASHINGTON.

AUTOMATIC GATE-OPERATING MECHANISM.

1,214,001. Specification of Letters Patent. Patented Jan. 30, 1917.

Application filed September 4, 1915. Serial No. 49,050.

*To all whom it may concern:*

Be it known that I, JOHN P. BEIL, a citizen of the United States, and resident of King county, in the State of Washington, have invented certain new and useful Improvements in Automatic Gate-Operating Mechanisms, of which the following is a specification.

My invention relates to automatic gate operating mechanisms, and comprises particularly a trip which may be operated by the wheel of a vehicle to open or close a gate.

The object of my invention is to provide a mechanism which will act positively to open or close a gate when actuated by a vehicle wheel, and one which will be of simple and inexpensive construction.

In the accompanying drawings I have shown my invention embodied in a form which is now preferred by me, together with a modification thereof.

Figure 1:
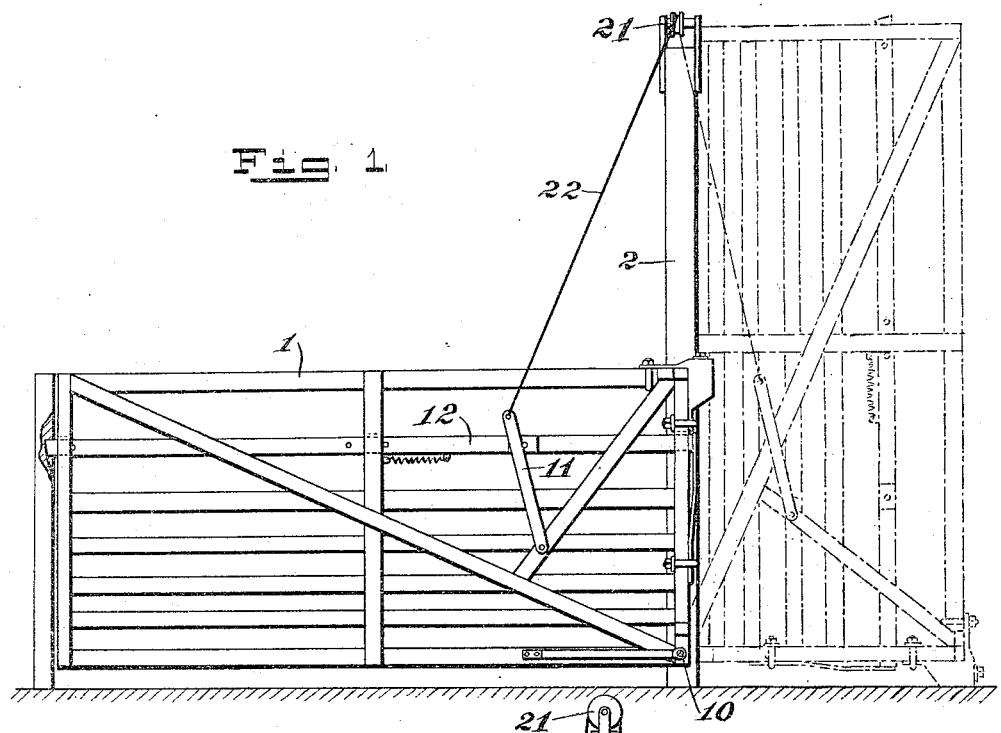
Figure 2:
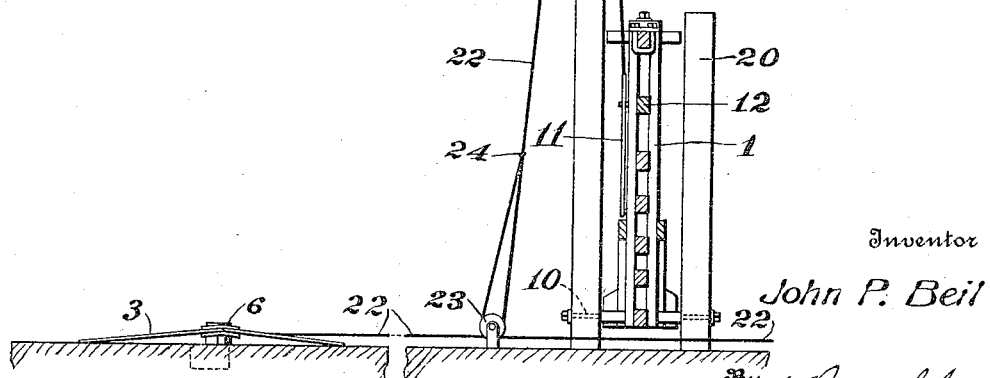

Figure 1 is an elevation of a gate which is to be operated by my device, showing the connection of the tripping mechanism therewith, and the manner of operation of this gate. Fig. 2 is a section through the gate, showing the connection of the operating mechanism with the gate. Fig. 3 is a plan view of my invention. Fig. 4 is a side elevation thereof, with an end of the casing removed. Fig. 5 is a longitudinal section of my device. Fig. 6 is a view similar to Fig. 4, showing a modified construction. Fig. 7 is a fragmentary section of the operating planks and their support.

The type of gate to which my device is attached is, in a measure, immaterial. My tripping mechanism is adapted to give a quick, strong pull, and I have therefore shown it as attached to operate a tilting gate, which necessitates a quick pull or jerk to tilt it. This gate is, in most respects, similar to the gate shown in my application for patent thereon, dated April 7, 1915, which was given Serial Number 19,649, and a short description thereof will suffice.

The gate 1 is pivoted at 10 in posts 2 and 20. Post 2 carries at its upper end a pulley 21, over which passes an operating cord 22. One end of this cord is secured to the gate through link 11, which may be adapted to operate a latch bar 12. The other end of this cord 22 passes about guide pulley 23, near the ground, and runs from thence to my operating mechanism. Preferably, two of these tripping or operating mechanisms are employed, one at each side of the gate. These are adapted to either open or close the gate, so that it may be opened by one trip, and after the vehicle has passed through, it may be closed by the other trip. In Fig. 2 the two lines 22 may be seen as secured together at 24, and extending in opposite directions from the pulley 23.

The operating mechanism comprises two operating planks 3, which are placed at the side of the road and are normally held slightly raised. An outer end of one of these planks may be fixed or pivoted, as shown at 30. The outer end of the other plank is slidable in guides 31, which prevent lateral displacement of the plank. The inner ends of the two planks, as shown in Fig. 7, rest upon a plate 32, which may be of metal, which in turn rests upon a block 33. Block 33 is provided with an upwardly projecting rod or bolt 35, which passes through a hole 36 in plate 32, and into recesses 37 in the ends of the operating planks, and has a loose fit therein. A strip of leather or heavy fabric, as 34, may be secured upon the planks 3 to cover their inner ends. One of the planks 3, or both, if desired, is fastened to the plate 32, as by screws 38, which may have a loose fit in holes 39.

The lower end of block 33 is beveled, and bears upon a lever arm 4. This lever arm is pivoted by one end at 40, and may be held raised by a spring, as 41. To the other end of this lever arm is secured an end of the operating cord 22, which passes up over a pulley 42, and thence to guide pulley 23, as has been described.

When a vehicle desires to pass through the gate, one of the wheels of the vehicle is driven upon the planks 3. This depresses lever 4, which gives the cord 22 a sharp pull, and raises the gate. After the vehicle has passed on, the spring 41 raises the operating planks again to their normal position. To close the gate, the vehicle wheel is passed over a similar mechanism at the other side of the gate. This jerks the cord again, and tilts the gate back into closed position.

In the modification shown in Fig. 6, a bell-crank lever 5, pivoted at 51, supports the end of lever 4 by one arm, and the end of cord 22 is attached to the other arm. The whole device may be inclosed in a casing 6, having a slot 61 for the passage of block 33, and sunk into the ground.

What I claim as my invention and desire to patent is:

1. An automatic gate operating mechanism comprising two planks placed at one side of the roadway end to end, a single lever fixedly pivoted at one end upon a horizontal pivot, said lever extending transversely of the length of said planks beneath and supporting the meeting ends thereof between its ends, a bell-crank lever having one end beneath the swinging end of the first-named lever, and means actuatively connecting the other end of the bell-crank lever with the gate.

2. An automatic gate-operating mechanism comprising two planks placed at one side of the roadway end to end, a single lever pivoted by one end upon a horizontal pivot, and extending transversely of the length of said planks beneath and supporting the meeting ends thereof between its ends, a spring acting normally to raise said lever, and means actuatively connecting the swinging end of said lever with the gate.

3. An automatic gate opening mechanism, comprising two planks placed at one side of the roadway end to end, a single lever fixedly pivoted by one end upon a horizontal pivot and extending transversely of the length of said planks beneath the meeting ends thereof, a block resting upon said lever between its ends, and supporting the meeting ends of said planks, and means actuatively connecting the swinging end of said lever with the gate.

4. An automatic gate opening mechanism, comprising two planks placed at one side of the roadway end to end, said planks being provided with complemental semi-circular recesses at their meeting ends, a lever pivoted by one end, and extending transversely of the length of said planks beneath the meeting ends thereof, a block resting upon said lever between its ends, and supporting the meeting ends of said planks, a bolt secured in the upper edge of said block and fitting in said semi-circular recesses and means actuatively connecting the swinging ends of said lever with the gate.

Signed at Seattle, Washington, this 28th day of August, 1915.

JOHN P. BEIL.

Copies of this patent may be obtained for five cents each, by addressing the "Commissioner of Patents, Washington, D. C."